Aug. 19, 1924.  M J. FRAMBACH  1,505,635
TIRE CHAIN
Filed Sept. 13, 1923
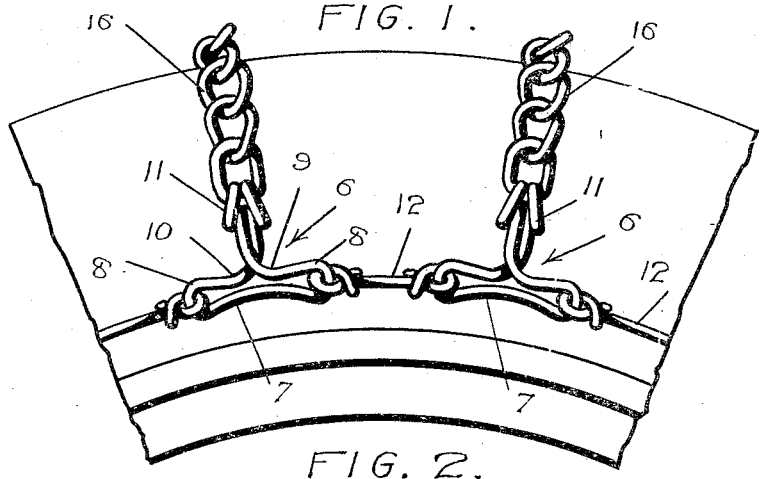
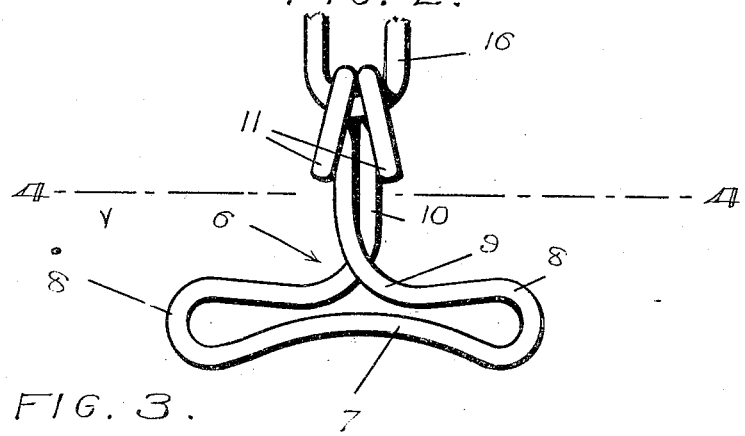
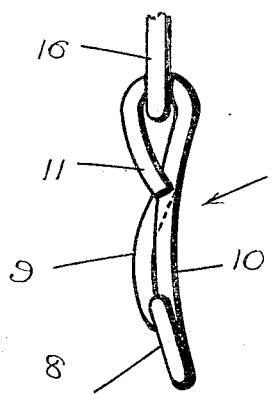
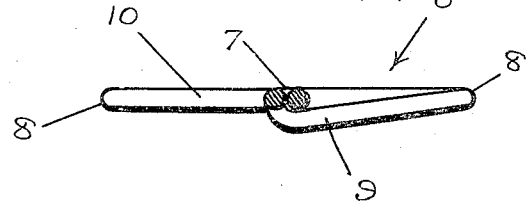
Inventor:
M. J. FRAMBACH,
By W. J. FitzGerald & Co.
Attorney.

Patented Aug. 19, 1924.

1,505,635

UNITED STATES PATENT OFFICE.

MATHEW J. FRAMBACH, OF HARTLEY, IOWA.

TIRE CHAIN.

Application filed September 13, 1923. Serial No. 662,475.

*To all whom it may concern:*

Be it known that I, MATHEW J. FRAMBACH, a citizen of the United States, residing at Hartley, in the county of O'Brien and State of Iowa, have invented certain new and useful Improvements in Tire Chains; and I do hereby declare the following to be a full, clear, and exact description of the invention, such as will enable others skilled in the art to which it appertains to make and use the same.

The present invention relates to chains or non-skid devices for use upon the tires of vehicle wheels, for enhancing the traction and preventing slipping, and an object of the invention is the provision of such a tire chain having links of novel and improved form in the longitudinal side retaining chains for the connection of the cross or tread chains, in order to afford a convenient assemblage of the links, to prevent the tangling thereof when handled or stored, and to prevent the links from opening up or pulling apart when the tire chain is subjected to considerable strain.

Another object is the formation of the connecting links of the longitudinal and cross chains in such a manner as not to chafe or injure the side walls of the tire, and also in order not to be opened up or injured by the rubbing of the links against a curb or other object when the wheel moves close to such curb or object.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a fragmentary side elevation showing a portion of the chain on a tire.

Fig. 2 is an enlarged side elevation of one of the improved connecting links.

Fig. 3 is an end view of the improved link.

Fig. 4 is a section on the line 4—4 of Fig. 2.

The present tire chain is similar, in general respects, to tire chains which are being used extensively, and consists, briefly stated, in a pair of longitudinal side retaining chains to be disposed at the opposite sides of the tire, and cross or transverse tread chains connected to the longitudinal chains to extend across the tire.

In carrying out the invention, the links 6 of the longitudinal chains, to which the cross chains are connected, are of special formation. Each link 6 is bent from a rod or length of stout wire, and the link has an intermediate portion 7 which is preferably curved slightly. The portion 7 extends substantially longitudinally of the longitudinal or side chain, and the wire is bent back at the ends of the portions 7 to provide the loops 8, from which the corresponding arms or portions 9 and 10 extend. The arms or portions 9 and 10 extend from the loops 8 toward and close to the central portion of the portion 7 and said arms are then curved or bent away from the portion 7, and cross one another close to the portion 7 where the arms are bent or curved away from the portion 7. The arms 9 and 10, beyond the point of crossing, are disposed side by side, and the terminals of the arms 9 and 10 are the terminals of the rod or wire and are bent back outwardly to form the hooks 11. The side of the link 6 which bears against the side wall of the tire is preferably curved, as seen in Fig. 3, to fit the tire, and the hooks 11 are disposed at that side of the link opposite to the side which bears against the tire. The arm 10, corresponding loop 8 and portion 7 are flush with the side of the link which bears against the tire, and the terminals of the arms 9 and 10 adjacent to the hooks 11 are also flush with one another. The arm or portion 9 and corresponding loop 8 are bent or offset, with a gentle curvature, between the hooks 11 and corresponding end of the portion 7, so that the arm or portion 9 can cross the arm 10 on the outer side opposite to the side of the link which bears against the tire, without any abrupt or sharp bends in the wire or rod. The portion 7, loops 8, arm or portion 10 and terminal portion of the arm 9 are thus flush with the surface of the link that bears against the tire, and the arm 9 crosses the arm 10 without presenting bends to the tire casing which would be apt to gouge into or chafe the tire.

The alternate links 12 of each longitudinal or side chain, as shown in Fig. 1, have their end portions engaging the loops 8 of the links 6, and the links 12 may be of any suitable kind. The links of each longitudinal chain are first assembled, the links 12 being slipped on the terminals of the links 6 and slid into position in the loops 8, by springing the arms 9 and 10 apart. The arms 9 and 10 being pressed or dented toward and adjacent to the portion 7 of each link 6, will close the throats of the loops 8, whereby the links 12 are retained in said loops, to prevent the tangling of the chain or the disarrangement of the links.

The terminal links of the cross chains 16 are readily engaged with pairs of hooks 11, which are disposed side by side, and the hooks 11 are then bent toward the arms 9 and 10. The terminals of the hooks 11 are spread apart to bear against the opposite sides of the arms 9 and 10, as seen in Figs 1 and 2, whereby said hooks will not be opened up accidentally by the scraping or rubbing of the links 6 against a curb or other object adjacent to which the wheel moves. The hooks 11 are thus closed and the terminals thereof brought to the opposite sides of the arms 9 and 10 in order to protect the hooks.

Owing to the crossing of the portions or arms 9 and 10, it will be noted that the terminal hooks 11 in bearing against one another will resist any tendency for the link 6 to be pulled open by the tensile strain on the longitudinal chain. Such tensile strain on the chain would have a tendency to separate the arms 9 and 10, but said arms being crossed and having their terminals overlapped will cause the terminals to bear more tightly together the greater the strain is.

The links 6 can also oscillate in the planes thereof when the chains 16 come into and move out of engagement with the road or pavement, for the creeping of the chain around the tire, and such oscillation of the connecting links 6 will facilitate the creeping action of the chain around the tire.

The links 6 are of substantially T-shape with the loops 8 at the ends of the head and the hooks 11 at the end of the shank or trunk. Should the links 6 be out of alinement on the wheel, they will adjust themselves, by the pulling action on the cross chains or members 16 on the tread or face of the tire when engaging the ground. In other words, the cross chains or members 16 in engaging the ground during the rotation of the wheel will create a pull on the links 6, which will straighten out said links should they be out of alinement.

Having thus described the invention, what is claimed as new is:—

1. A chain link having an intermediate portion, loops at the ends of said portion for the engagement of other links, arms extending from said loops and away from said intermediate portion, and hooks at the terminals of the arms to bear against one another side by side, said hooks having terminals spread apart and bent to opposite sides of said arms.

2. A chain link having an intermediate portion, loops at the ends of said portion for the engagement of other links, arms extending from said loops, said arms crossing one another and extending beyond the point of crossing away from said intermediate portion, and hooks at the terminals of said arms to bear together side by side, the terminals of the hooks being spread apart and bent to the opposite sides of said arms.

3. A chain link to bear at one side against a tire and having an intermediate portion, loops at the ends of said portion for the engagement of other links, arms extending from said loops and having bends crossing one another adjacent to said intermediate portion, said arms being disposed side by side beyond the point of crossing and extending away from said intermediate portion, and hooks at the terminals of said arms to be disposed side by side, said hooks being located at the side of the link opposite to the firstnamed side, said intermediate portion, loops and one of the arms being flush with the firstnamed side of the link to bear against the tire, and the other arm being offset with a gentle curvature between the hooks and corresponding loop away from the firstnamed side of the link across the aforesaid arm.

In testimony whereof I have signed my name to this specification in the presence of two subscribing witnesses.

MATHEW J. FRAMBACH.

Witnesses:
E. L. RANDOLPH,
F. R. PATCH.